United States Patent
Sano

(10) Patent No.: US 6,241,811 B1
(45) Date of Patent: Jun. 5, 2001

(54) PROCESS FOR THE PREPARATION OF INK FOR INK-JET RECORDING

(75) Inventor: Tsuyoshi Sano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/194,649

(22) PCT Filed: Apr. 2, 1998

(86) PCT No.: PCT/JP98/01524

§ 371 Date: Apr. 27, 1999

§ 102(e) Date: Apr. 27, 1999

(87) PCT Pub. No.: WO98/44059

PCT Pub. Date: Oct. 8, 1998

(30) Foreign Application Priority Data

Apr. 2, 1997 (JP) .................................................. 9-084247

(51) Int. Cl.$^7$ .................................................. C09D 11/00
(52) U.S. Cl. .................................. 106/31.85; 106/31.86; 106/31.89
(58) Field of Search .............................. 106/31.85, 31.86, 106/31.89

(56) References Cited

U.S. PATENT DOCUMENTS

| | | | |
|---|---|---|---|
| 4,597,794 | 7/1986 | Ohta | 106/20 |
| 5,085,698 | 2/1992 | Ma | 106/20 |
| 5,221,334 | 6/1993 | Ma | 106/20 D |
| 5,272,201 | 12/1993 | Ma | 524/505 |
| 5,310,778 | 5/1994 | Shor | 524/556 |

FOREIGN PATENT DOCUMENTS

| | | |
|---|---|---|
| 56-147861 | 11/1981 | (JP) . |
| 3-157464 | 7/1991 | (JP) . |
| 3157464 | 7/1991 | (JP) . |
| 4-359071 | 12/1992 | (JP) . |
| 4-359072 | 12/1992 | (JP) . |
| 4359071 | 12/1992 | (JP) . |
| 4359072 | 12/1992 | (JP) . |

Primary Examiner—Helene Klemanski
Assistant Examiner—Veronica F. Faison
(74) Attorney, Agent, or Firm—Ladas & Parry

(57) ABSTRACT

A process for producing an ink composition is disclosed which can provide an ink composition that is less likely to create feathering or bleeding and can provide an increased dot diameter in a reduced amount of the ink ejected. According to the process, a pigment, a dispersant, water, and an alkyl ether derivative, with 3 or more carbon atoms, of a polyhydric alcohol and/or an acetylene glycol compound represented by the following formula (I):

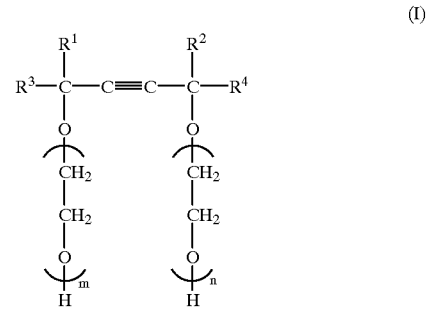

wherein $R^1$, $R^2$, $R^3$ and $R^4$ each independently represent an alkyl group having 1 to 6 carbon atoms; and n and m are an integer, provided that the sum of n and m is 0 to 30, are dispersed in one another by means of a dispergator to prepare a dispersion which is then used to prepare an ink. The ink composition thus prepared is less likely to cause feathering or bleeding and can realize a large dot diameter in a reduced amount of the ink ejected, as compared with an ink composition prepared by first preparing a dispersion from a pigment and a dispersant and then adding an alkyl ether derivative, with 3 or more carbon atoms, of a polyhydric alcohol and/or an acetylene glycol compound represented by the following formula (I) to the dispersion.

17 Claims, No Drawings

PROCESS FOR THE PREPARATION OF INK FOR INK-JET RECORDING

BACKGROUND OF THE INVENTION

1. Field of the Invention

The present invention relates to a process for producing an ink composition which is preferably used in ink jet recording, and an ink composition prepared thereby.

2. Background Art

An ink prepared by adding a dye as a water-soluble colorant component to an aqueous medium is generally known as an ink for ink jet recording. On the other hand, however, there are not a few dyes having poor lightfastness, waterfastness and other various properties. Utilization of an ink composition comprising a pigment as a colorant component has recently been studied from the viewpoint of improving the above properties.

Since the pigment is generally insoluble in water, utilization thereof in water-based ink compositions requires that the pigment is mixed with a polymer called a "dispersant" and the like to prepare a mixture which is then stably dispersed in water followed by preparation of an ink composition using the dispersion.

Stable dispersion of the pigment in an aqueous system requires studies on type and particle diameter of pigments, type of dispersants, dispersion methods and the like. Up to now, various dispersion methods and ink compositions for ink jet recording have been proposed in the art.

Japanese Patent Laid-Open No. 157954/1994 discloses that a pigment and a polymeric dispersant are charged into a two-roll milling (two-roll mill) device to prepare a pigment dispersion that is then dispersed in an aqueous carrier medium to prepare an ink composition for ink jet recording.

Japanese Patent Publication No. 55548/1986 discloses that a polymer (a dispersant) previously prepared by polymerizing a monomer is dispersed together with a pigment and a water-soluble polyhydric alcohol (ethylene glycol) in a ball mill, a sand mill or the like to prepare a pigment dispersion for the preparation of an ink composition for ink jet recording.

Japanese Patent Laid-Open No. 227668/1992 discloses a process for producing an ink composition, comprising the steps of: providing a previously prepared block polymer as a dispersant, using this dispersant in combination with a pigment, a water-soluble organic solvent, such as diethylene glycol, and water in a horizontal Mini mill or the like to prepare a dispersion; and diluting the dispersion to prepare an ink composition.

In ink jet recording, an improvement in response frequency of a recording head is necessary from the viewpoint of improving recording speed. To this end, the amount of the ink ejected is preferably small. For this, preferably, a larger dot diameter is provided using a smaller amount of the ink ejected. On the other hand, however, particularly in a blotted recorded image (solid image), a larger amount of ink should be ejected in order to eliminate the creation of white streaks caused by lack of dot diameter.

A commonly used method for solving this problem is to add a surfactant or a glycol ether to an ink to impart a penetrating property. In the case of pigment-based inks, for example, Japanese Patent Laid-Open No. 147861/1981 proposes utilization of triethylene glycol monomethyl ether as a pigment.

Further, the ink for ink jet recording has generally been prepared by dispersing a pigment together with a dispersant to prepare a pigment dispersion and adding various components to the pigment dispersion.

SUMMARY OF THE INVENTION

The present inventors have now found that, in producing a pigment-based ink composition, a change in sequence of dispersion of additive components leads to a change in properties of the resultant ink composition. They have further found that dispersion of specific components together with a pigment enables the production of an ink composition which, when printed on a recording medium, is less likely to cause feathering or bleeding and can realize a large dot diameter in a reduced amount of the ink ejected. The present invention has been made based on such finding.

Accordingly, an object of the present invention is to provide a process for producing an ink composition for ink jet recording which can increase the dot diameter in a smaller amount of ink ejected, and an ink composition produced by the above process.

According to one aspect of the present invention, there is provided a process for producing an ink composition according to the present invention, said ink composition comprising at least a pigment, a dispersant, water, and an alkyl ether derivative, with 3 or more carbon atoms, of a polyhydric alcohol and/or an acetylene glycol compound represented by the following formula (I):

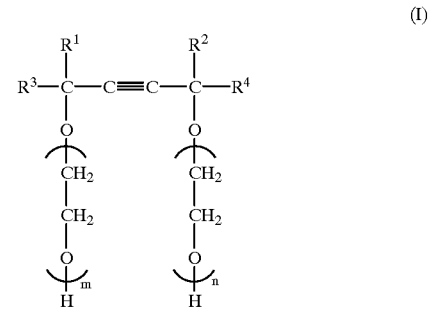

wherein $R^1$, $R^2$, $R^3$, and $R^4$ each independently represent an alkyl group having 1 to 6 carbon atoms; and n and m are an integer, provided that the sum of n and m is 0 to 30, said process comprising the steps of:
dispersing a mixture comprising at least a pigment, a dispersant, water, and an alkyl ether derivative, with 3 or more carbon atoms, of a polyhydric alcohol and/or an acetylene glycol compound represented by the formula (I) to prepare a dispersion or an ink composition; and
optionally preparing an ink from the dispersion.

According to another aspect of the present invention, there is provided an ink composition produced by the above process.

DETAILED DESCRIPTION OF THE INVENTION

Ink Composition

The ink composition according to the present invention may be used in recording methods using an ink composition. Recording methods using an ink composition include, for example, an ink jet recording method, a recording method using writing utensils, such as pens, and other various printing methods. Particularly preferably, the ink composition according to the present invention is used in the ink jet recording method.

In the process for producing an ink according to the present invention, a mixture comprising a pigment, a dispersant, water, and an alkyl ether derivative, with 3 or more carbon atoms, of a polyhydric alcohol and/or an acetylene glycol compound represented by the formula (I) is subjected to the dispersing step. According to a conventional process for producing a pigment-based ink composition comprising an alkyl ether derivative, with 3 or more carbon atoms, of a polyhydric alcohol or an acetylene glycol compound represented by the formula (I), a pigment is first dispersed together with water and a dispersant to prepare a pigment dispersion to which an alkyl ether derivative, with 3 or more carbon atoms, of a polyhydric alcohol or an acetylene glycol compound represented by the formula (I) is added. By contrast, according to the process of the present invention, all of these components are simultaneously subjected to the dispersing step.

The ink composition prepared by simultaneously subjecting all the components to the dispersing step has an advantage that, as compared with an ink composition prepared by first preparing a dispersion from a pigment and a dispersant and then adding an alkyl ether derivative, with 3 or more carbon atoms, of a polyhydric alcohol or an acetylene glycol compound represented by the following formula (I) to the dispersion, a recorded image suffering from a lesser degree of feathering or bleeding can be realized on a recording medium and, in addition, the same dot diameter can be realized in a smaller amount of the ink ejected. In other words, the ink composition according to the present invention, when the amount of the ink composition ejected is identical, can provide a larger dot diameter. In particular, a relatively large dot diameter can be realized in a smaller amount of ink on a recording medium designed so as to yield a high-quality image, that is, a recording medium (a gloss film) comprising a transparent coating provided on the surface of a white film as a substrate.

It is surprising that the sequence of dispersion of components can greatly improve the properties of the ink composition. Although the reason why the properties of the ink composition can be improved has not been elucidated yet, it is considered that, in the dispersing step, sufficient interaction between the dispersant and the alkyl ether derivative of a polyhydric alcohol and the acetylene glycol compound represented by the formula (I) permits a recording medium to be satisfactorily wetted with the ink composition. This mechanism, however, is merely hypothetical, and the present invention should not be construed to be limited by this mechanism.

Production of Ink Composition

Dispersing Step

As described above, according to the process of the present invention, a mixture comprising at least a pigment, a dispersant, water, and an alkyl ether derivative, with 3 or more carbon atoms, of a polyhydric alcohol and/or an acetylene glycol compound represented by the formula (I) is subjected to the step of dispersion.

The dispersion may be carried out, for example, by a ball mill, a sand mill, an attritor, a roll mill, an agitator mill, a Mini mill, a Henschel mixer, a colloid mill, an ultrasonic homogenizer, a jet mill, an angmill, or a spike mill. However, the dispersion may be carried out using other devices than described above so far as a satisfactory dispersion can be produced.

The time necessary for the dispersing step is influenced by the type of the dispergator, energy efficiency, the stress applied to the dispersion and the like and hence is not particularly limited. The time, however, should be long enough to provide satisfactory dispersion and to cause satisfactory interaction between the alkyl ether derivative of the polyhydric alcohol or the acetylene glycol compound and the dispersant. In general, the time is generally determined according to specifications of the device used.

For example, when a sand mill (manufactured by Yasukawa Seisakusho) is used, the components are dispersed together with glass beads (diameter: 1.7 mm, amount: 1.5 times (by weight) larger than the mixture) at room temperature for about one hr. When Mini mill 100 (Eiger Machinery Inc., Bensenbille Ill.) is used, the dispersing step is carried out at 3000 to 4000 rpm for about 2 hr.

The dispersant used in the present invention may be any dispersant commonly used for the dispersion of a pigment. Examples thereof include polymeric compounds and surfactants with polymeric compounds being preferred.

It would be evident to a person having ordinary skill in the art that polymeric compounds can be preferably utilized as the dispersant. It is generally considered that the dispersion is attained when repulsion large enough to repel an attractive -force created among pigment particles is produced. There are two types of repulsion, one of which is created by a surface potential provided by an electrical double layer created on the surface of the particles and the other is created by steric hindrance caused by an adsorption layer that is adsorbed on the surface of particles and spread from the surface. When the repulsion is larger (denser) and reaches a more far site from the surface of particles, stable dispersion can be obtained. It is believed that, as compared with a surfactant having a molecular weight of several tens to several hundreds, a polymeric compound having a molecular weight of several thousands to several tens of thousands can generally provide a more stable dispersion.

Examples of preferred polymeric dispersants usable herein include naturally occurring polymers, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, ammonium alginate, and sodium alginate; and cellulose derivatives, such as methylcellulose, carboxymethylcellulose, hydroxyethylcellulose, and ethylhydroxyethylcellulose.

Preferred polymeric dispersants usable herein include synthetic polymers, and examples thereof include polyvinyl alcohols, polyvinyl pyrrolidones, acrylic resins, such as polyacrylic acid, acrylic acid/acrylonitrile copolymer, potassium acrylate/acrylonitrile copolymer, vinyl acetate/acrylic ester copolymer, and acrylic acid/alkyl acrylate copolymer, styrene/acrylic acid resins, such as styrene/acrylic acid copolymer, styrene/methacrylic acid/alkyl acrylate copolymer, styrene/α-methylstyrene/acrylic acid copolymer, and styrene/α-methylstyrene/acrylic acid/alkyl acrylate copolymer, styrene/maleic acid copolymer, styrene/maleic anhydride copolymer, vinylnaphthalene/acrylic acid copolymer, vinyl acetate/ethylene copolymer, vinyl acetate/fatty acid/vinylethylene copolymer, vinyl acetate/maleic ester copolymer, and salts of the above polymers. Among them, a copolymer of a monomer having a hydrophobic group with a monomer having a hydrophilic group and a polymer of a monomer having both a hydrophobic group and a hydrophilic group in its molecular structure are particularly preferred. Examples of salts usable herein include salts thereof with diethylamine, ammonia, ethylamine, triethylamine, propylamine, isopropylamine, dipropylamine, butylamine, isobutylamine, triethanolamine, diethanolamine, and aminomethylpropanolmorpholine. For these copolymers, the weight average molecular weight is preferably about 3,000 to 30,000, more preferably about 5,000 to 15,000.

Although the amount of the dispersant added is not particularly limited, it is preferably in the range of from 0.06 to 3% by weight, more preferably in the range of from 0.125 to 3% by weight, based on the pigment.

The polyhydric alcohol moiety in the alkyl ether derivative of the polyhydric alcohol is preferably an ethylene glycol compound, more preferably an ethylene glycol compound with the number of repetitions of the ethylene oxide moiety being about 1 to 3. The alkyl ether moiety has 3 or more carbon atoms, more preferably 4 or more carbon atoms with a butyl ether moiety being particularly preferred. Specific examples of the alkyl ether derivative of the polyhydric alcohol include diethylene glycol mono-n-butyl ether, triethylene glycol mono-n-butyl ether, and propylene glycol mono-n-butyl ether. They may be used alone or as a mixture of two or more. Utilization of triethylene glycol mono-n-butyl ether and a mixture containing triethylene glycol mono-n-butyl ether is preferred.

The amount of the alkyl ether derivative of a polyhydric alcohol added is preferably about 0.5 to 20% by weight, more preferably 3 to 15% by weight, based on the dispersion.

In the formula (I), the alkyl group having 1 to 6 carbon atoms represented by $R^1$, $R^2$, $R^3$, and $R^4$ is preferably an alkyl having 1 to 6 carbon atoms, more preferably a methyl group. n and m are integers, provided that the sum of n and m is 0 to 30.

Examples of preferred acetylene glycol compounds represented by the formula (I) include 2,4,7,9-tetramethyl-5-decyne-4,7-diol, 3,6-dimethyl-4-octyne-3,6-diol, and 3-5-dimethyl-1-hexyne-3-diol. Commercially available products may be used as the compound represented by the formula (I), and examples thereof include Surfynol 104, 82, 465, 485, and TG manufactured by Nissin Chemical Industry Co., Ltd.

The amount of the acetylene glycol compound added is preferably about 0.01 to 10% by weight, more preferably 0.1 to 5% by weight, based on the dispersion produced.

In the present invention, regarding the pigment, inorganic and organic pigments are usable without any particular limitation. Examples of the inorganic pigment include, in addition to titanium oxide and iron oxide, carbon blacks produced by known processes, such as contact, furnace, and thermal processes. Examples of the organic pigment include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, among these pigments, those having good affinity for water are preferred.

Although the particle diameter of the pigment is not particularly limited, it is preferably not more than 10 µm, more preferably not more than 0.1 µm.

The process for producing an ink according to the present invention basically comprises dispersing a mixture comprising a pigment, a dispersant, water, and an alkyl ether derivative, with 3 or more carbon atoms, of a polyhydric alcohol and/or an acetylene glycol compound represented by the formula (I) to obtain a dispersion. According to another embodiment of the present invention, in the dispersing step, dispersion may be carried out after the addition of a part or all of other components, described below, of the ink composition. Dispersing a mixture containing all the components of the ink composition can provide an ink composition in a single dispersing step.

Step of Preparing Ink

The step of preparing an ink comprises adding other components of an ink composition, to be prepared, to the dispersion prepared in the dispersing step to prepare the ink composition.

Examples of preferred other components usable herein will be described later. In this step of preparing an ink composition, the alkyl ether derivative of the polyhydric alcohol and/or the acetylene glycol compound represented by the formula (I) may be further added. In the final ink composition, the amount of the alkyl ether derivative of the polyhydric alcohol added is preferably about 0.5 to 20% by weight, more preferably about 3 to 15% by weight, and the amount of the acetylene glycol compound represented by the formula (I) added is preferably about 0.01 to 10% by weight, more preferably about 0.1 to 5% by weight.

Examples of preferred other components added to the ink composition are as follows.

According to a preferred embodiment of the present invention, the ink composition further comprises a wetting agent from the viewpoint of preventing nozzle clogging of a recording head. Examples of preferred wetting agents include diethylene glycol, polyethylene glycol, polypropylene glycol, ethylene glycol, propylene glycol, butylene glycol, triethylene glycol, 1,2,6-hexanetriol, thioglycol, hexylene glycol, glycerin, trimethylolethane, trimethylolpropane, urea, 2-pyrrolidone, 1,3-dimethyl-2-imidazole, imidazole, and N-methyl-2-pyrrolidone. Further, the ink composition may contain a saccharide. Examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol (sorbit), maltose, cellobiose, lactose, sucrose, trehalose, and maltotriose. The term "polysaccharide" used herein refers to saccharides, in a broad sense, including substances which widely exist in the natural world, such as cellulose.

The amount of the wetting agent added is not particularly limited. It, however, is suitably 0.5 to 40% by weight, preferably 2 to 20% by weight, based on the ink composition.

pH adjustors may be added to the ink composition from the viewpoint of further improving the dispersion stability of the pigment. Specific examples of preferred pH adjustors usable herein include alkali metal compounds, such as sodium hydroxide, potassium hydroxide, lithium hydroxide, sodium carbonate, sodium hydrogencarbonate, potassium carbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogentartrate, ammonia, and amines, such as methylamine, ethylamine, diethylamine, tris (hydroxymethyl)aminomethane hydrochloride, triethanolamine, morpholine, and propanolamine.

Commercially available antioxidants, ultraviolet absorbers and the like may also be used. Examples thereof include Tinuvin 328, 900, 1130, 384, 292, 123, 144, 622, 770, and 292, Irgacor 252 and 153, and Irganox 1010, 1076, 1035, and MD1024, manufactured by Ciba-Geigy.

Other additives, such as electric conductivity modifiers, pH adjustors, surface tension modifiers, and oxygen absorbers, may be optionally used in the ink composition for ink jet recording according to the present invention.

EXAMPLES

The present invention will be described in more detail with reference to the following examples, though it is not limited to these examples only. Abbreviations used in the following description are as follows.

TEGmBE: triethylene glycol mono-n-butyl ether

DEGmBE: diethylene glycol mono-n-butyl ether

TEA: triethanolamine

NaOH: sodium hydroxide

KOH: potassium hydroxide

Example 1

| (1) Preparation of pigment dispersion | |
|---|---|
| Carbon Black MA7 (manufactured by Mitsubishi Chemical Corporation) | 10 wt % |
| Styrene/acrylic acid copolymer (dispersant) Molecular weight = 7000 | 10 wt % |
| TEGmBE | 8 wt % |
| Surfynol 465 | 2.4 wt % |
| Ethylene glycol | 5 wt % |
| Pure water | Balance |

These ingredients were mixed together, and the mixture, together with glass beads (diameter: 1.7 mm, amount: 1.5 times (by weight) larger than the mixture), was dispersed at room temperature for one hr in a sand mill (manufactured by Yasukawa Seisakusho) to prepare a pigment dispersion 1.

| (2) Preparation of ink composition | |
|---|---|
| Pigment dispersion 1 | 20 wt % |
| Glycerin | 7 wt % |
| Sucrose | 10 wt % |
| TEGmBE (Total amount in ink composition: 6.6 wt %) | 5 wt % |
| Surfynol 465 (Total amount in ink composition: 1 wt %) | 0.52 wt % |
| TEA | 0.5 wt % |
| Pure water | Balance |

These components were stirred at room temperature for 20 min. The resultant mixture was filtered through a 5 μm membrane filter to prepare an ink composition containing 2% by weight of the pigment.

Example 2

| | |
|---|---|
| C.I Pigment Black 1 | 3 wt % |
| Styrene/acrylic acid copolymer (dispersant) Molecular weight = 7000 | 4 wt % |
| Diethylene glycol | 5 wt % |
| Glycerin | 10 wt % |
| TEGmBE | 8 wt % |
| Surfynol 465 | 1 wt % |
| Potassium hydroxide | 0.2 wt % |
| Pure water | Balance |

All the above ingredients were charged into a Mini mill 100 (Eiger Machinery Inc., Bensenbille Ill.), and milling was carried out at 3000 rpm for 2 hr. The resultant dispersion was filtered through a 5 μm membrane filter to prepare an ink composition containing 3% by weight of the pigment.

Example 3

| (1) Preparation of pigment dispersion | |
|---|---|
| Carbon Black MA100 (manufactured by Mitsubishi Chemical Corporation) | 15 wt % |
| Styrene/acrylic acid copolymer (dispersant) Molecular weight = 7000 | 15 wt % |
| Diethylene glycol | 7 wt % |
| DEGmBE | 12 wt % |
| Surfynol 465 | 2.5 wt % |
| KOH | 1 wt % |
| Pure water | Balance |

These ingredients were mixed together, and the mixture, together with glass beads (diameter: 1.7 mm, amount: 1.5 times (by weight) larger than the mixture), was dispersed at room temperature for one hr in a sand mill (manufactured by Yasukawa Seisakusho) to prepare a pigment dispersion 2.

| (2) Preparation of ink composition | |
|---|---|
| Pigment dispersion 2 | 20 wt % |
| Glycerin | 12 wt % |
| Xylose | 10 wt % |
| DEGmBE (Total amount in ink composition: 8 wt %) | 4 wt % |
| Surfynol 465 (Total amount in ink composition: 1.5 wt %) | 1 wt % |
| Pure water | Balance |

These components were stirred at room temperature for 20 min. The resultant mixture was filtered through a 5 μm membrane filter to prepare an ink composition containing 3% by weight of the pigment.

Example 4

| (1) Preparation of pigment dispersion | |
|---|---|
| Pigment KETBLUEEX-1 (manufactured by Dainippon Ink and Chemicals, Inc.) | 10 wt % |
| Styrene/acrylic acid copolymer (dispersant) Molecular weight = 7000 | 11 wt % |
| Glycerin | 7 wt % |
| Surfynol 465 | 2.5 wt % |
| NaOH | 1 wt % |
| Pure water | Balance |

These ingredients were mixed together, and the mixture, together with glass beads (diameter: 1.7 mm, amount: 1.5 times (by weight) larger than the mixture), was dispersed at room temperature for one hr in a sand mill (manufactured by Yasukawa Seisakusho) to prepare a pigment dispersion 3.

| (2) Preparation of ink composition | |
|---|---|
| Pigment dispersion 3 | 20 wt % |
| Maltitol | 10 wt % |
| Surfynol 465 | 1 wt % |
| (Total amount in ink composition: 1.5 wt %) | |
| Pure water | Balance |

These components were stirred at room temperature for 20 min. The resultant mixture was filtered through a 5 μm membrane filter to prepare an ink composition containing 2% by weight of the pigment.

Comparative Example 1

| (1) Preparation of pigment dispersion | |
|---|---|
| Carbon Black MA7 (manufactured by Mitsubishi Chemical Corporation) | 10 wt % |
| Styrene/acrylic acid copolymer (dispersant) Molecular weight = 7000 | 10 wt % |
| Ethylene glycol | 5 wt % |
| Pure water | Balance |

These ingredients were mixed together, and the mixture, together with glass beads (diameter: 1.7 mm, amount: 1.5 times (by weight) larger than the mixture), was dispersed at room temperature for one hr in a sand mill (manufactured by Yasukawa Seisakusho) to prepare a pigment dispersion 4.

| (2) Preparation of ink composition | |
|---|---|
| Pigment dispersion 4 | 20 wt % |
| Glycerin | 7 wt % |
| Sucrose | 10 wt % |
| TEGmBE | 6.6 wt % |
| Surfynol 465 | 1 wt % |
| TEA | 0.5 wt % |
| Pure water | Balance |

These components were stirred at room temperature for 20 min. The resultant mixture was filtered through a 5 μm membrane filter to prepare an ink composition having the same composition as that prepared in Example 1.

Comparative Example 2

| (1) Preparation of pigment dispersion | |
|---|---|
| C.I Pigment Black 1 | 6 wt % |
| Styrene/acrylic acid copolymer (dispersant) Molecular weight = 7000 | 8 wt % |
| Diethylene glycol | 10 wt % |
| Glycerin | 20 wt % |
| Potassium hydroxide | 0.4 wt % |
| Pure water | Balance |

The above mixture was charged into a Mini mill 100 (Eiger Machinery Inc., Bensenbille Ill.), and milling was carried out at 3000 rpm for 2 hr. Thus, a pigment dispersion 5 was prepared.

| (2) Preparation of ink composition | |
|---|---|
| Pigment dispersion 5 | 50 wt % |
| TEGmBE | 8 wt % |
| Surfynol 465 | 1 wt % |
| Pure water | Balance |

These components were stirred at room temperature for 20 min. The resultant mixture was filtered through a 5 μm membrane filter to prepare an ink composition having the same composition as that prepared in Example 2.

Comparative Example 3

| (1) Preparation of pigment dispersion | |
|---|---|
| Pigment KETBLUEEX-1 (manufactured by Dainippon Ink and Chemicals, Inc.) | 10 wt % |
| Styrene/acrylic acid copolymer (dispersant) Molecular weight = 7000 | 11 wt % |
| Glycerin | 7 wt % |
| NaOH | 1 wt % |
| Pure water | Balance |

These ingredients were mixed together, and the mixture, together with glass beads (diameter: 1.7 mm, amount: 1.5 times (by weight) larger than the mixture), was dispersed at room temperature for one hr in a sand mill (manufactured by Yasukawa Seisakusho) to prepare a pigment dispersion 6.

| (2) Preparation of ink composition | |
|---|---|
| Pigment dispersion 6 | 20 wt % |
| Maltitol | 10 wt % |
| Pure water | Balance |

These components were stirred at room temperature for 20 min. The resultant mixture was filtered through a 5 μm membrane filter to prepare an ink composition having the same composition as that prepared in Example 4, except that Surfynol 465 was not contained.

Evaluation Tests on Ink Compositions

The following evaluation tests were carried out using an ink jet printer "MJ-810C," manufactured by Seiko Epson Corporation. The ejection rate of the ink was constant and 0.040 μg per dot.

Evaluation 1: Dot diameter

A blotted image (100 duty) having a size of 50 points in length and 200 points in width was printed on a specialty gloss film having a gloss surface (manufactured by Seiko Epson Corporation) as a specialty recording medium for ink jet recording, and the evenness thereof was evaluated. To this end, the blotted image was inspected for white streaks created along scanning lines in the case of uneven blotting. The results were evaluated according to the following criteria.

A: Even blotted image free from white streak
    B: Light color blotted image on the whole with white streak present in part of the blotted image
    C: Harsh blotted image with white streak present on the whole blotted image Evaluation 2: Feathering Letters having a size of 4 points, 10 points, and 20 points and blotted images having a size of 50 points in length and 200 points in width were printed on printing papers, and the prints were inspected for feathering at edge of the letters and blotted images. Papers used for the tests were Xerox P Paper (Xerox Corp.), Ricopy 6200 Paper (Ricoh Co. Ltd.), Xerox 4024 Paper (Xerox Corp.), Neenah Bond Paper (Kimberly-Clark), Xerox R Paper (Xerox Corp., recycled paper), and Yamayuri paper (Honshu Paper Co., Ltd., recycled paper).

The results were evaluated according to the following criteria.

A: Good letter quality free from feathering independently of types of papers

B: Deteriorated quality due to feathering on some types of papers.

The results of evaluation are summarized in the following table.

TABLE 1

|  | Evaluation 1 | Evaluation 2 |
| --- | --- | --- |
| Example 1 | A | A |
| Example 2 | A | A |
| Example 3 | A | A |
| Example 4 | A | A |
| Comparative Example 1 | B | A |
| Comparative Example 2 | B | A |
| Comparative Example 3 | C | B |

What is claimed is:

1. A process for producing an ink composition, said ink composition comprising components including a pigment, a dispersant, water and an alkyl ether derivative, with 3 or more carbon atoms, of a polyhydric alcohol and/or an acetylene glycol compound represented by the following formula (I):

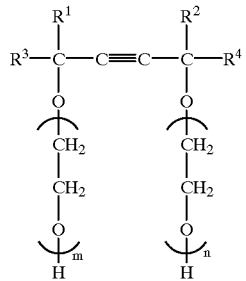

(I)

wherein $R^1$, $R^2$, $R^3$, and $R^4$, each independently represent an alkyl group having 1 to 6 carbon atoms; and n and m are an integer, provided that the sum of n and m is 0 to 30, said process comprising the steps of:

dispersing a mixture comprising at least the pigment, the dispersant, water, and the alkyl ether derivative, with 3 or more carbon atoms, of a polyhydric alcohol and/or the acetylene glycol compound represented by the formula (I) to prepare the ink composition.

2. The process according to claim 1, wherein the dispersing step is carried out by means of a ball mill, a sand mill, an attritor, a (2-, 3-, 4-, or 5-) roll mill, an agitator mill, a Mini mill, a Henschel mixer, a colloid mill, an ultrasonic homogenizer, a jet mill, an angmill, a spike mill, a bead mill, and a wet mill.

3. The process according to claim 1, wherein the dispersant is a polymeric compound.

4. The process according to claim 3, wherein the polymeric compound has an average molecular weight of 3,000 to 30,000.

5. The process according to claim 1, wherein the dispersion contains 0.5 to 20% by weight of the alkyl ether derivative of a polyhydric alcohol and/or 0.01 to 10% by weight of the acetylene glycol compound represented by the formula (I).

6. The process according to claim 1, wherein the alkyl ether derivative of a polyhydric alcohol is at least one member selected from triethylene glycol mono-n-butyl ether, diethylene glycol mono-n-butyl ether, and propylene glycol mono-n-butyl ether.

7. An ink composition for ink jet recording produced by the process according to claim 1.

8. A recording method comprising the step of depositing an ink composition onto a recording medium to perform printing, wherein the ink composition is one according to claim 7.

9. An ink jet recording method comprising the steps of: ejecting a droplet of an ink composition; and depositing the droplet onto a recording medium to perform printing, wherein the ink composition is one according to claim 7.

10. A recording medium recorded by the recording method according to claim 8.

11. The process according to claim 1 further comprising the step of adding to the ink composition at least one other component to form a resultant ink.

12. A process for producing a pigment dispersion, comprising the step of dispersing a mixture comprising at least a pigment, a dispersant, water, and an alkyl ether derivative, with 3 or more carbon atoms, of a polyhydric alcohol and/or an acetylene glycol compound represented by the following formula (I):

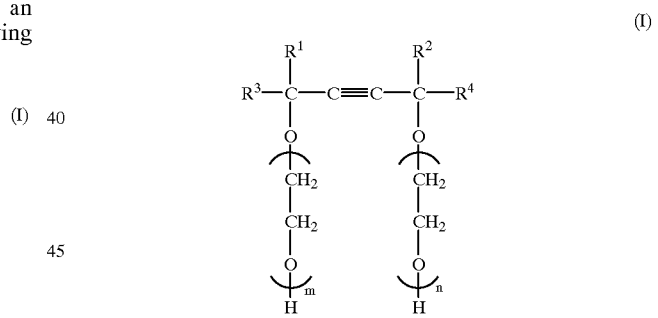

(I)

wherein $R^1$, $R^2$, $R^3$, and $R^4$, each independently represent an alkyl group having 1 to 6 carbon atoms; and n and m are an integer, provided that the sum of n and m is 0 to 30.

13. The process according to claim 12, wherein the dispersion step is carried out by means of a ball mill, a sand mill, an attritor, a (2-, 3-, 4- or 5-) roll mill, an agitator mill, a Mini mill, a Henschel mixer, a colloid mill, an ultrasonic homogenizer, a jet mill, an angmill, a spike mill, a bead mill, or a wet mill.

14. The process according to claim 12, wherein the dispersant is a polymeric compound.

15. The process according to claim 12, wherein the polymeric compound has an average molecular weight of 3,000 to 30,000.

16. The process according to claim 12, wherein the dispersion contains 0.5 to 20% by weight of the alkyl ether derivative of a polyhydric alcohol and/or 0.01 to 10% by weight of the acetylene glycol compound represented by the formula (I).

17. The process according to claim 12, wherein the alkyl ether derivative of a polyhydric alcohol is at least one member selected from triethylene glycol mono-n-butyl ether, diethylene glycol mono-n-butyl ether, and propylene glycol mono-n-butyl ether.

* * * * *